(12) United States Patent
Carter et al.

(10) Patent No.: US 9,038,778 B1
(45) Date of Patent: May 26, 2015

(54) UPRIGHT ADAPTOR FOR LADDER TREE STAND

(71) Applicants: Robert Charles Carter, Roxboro, NC (US); Ferdinand Larsh Carter, Roxboro, NC (US)

(72) Inventors: Robert Charles Carter, Roxboro, NC (US); Ferdinand Larsh Carter, Roxboro, NC (US)

( * ) Notice: Subject to any disclaimer, the term of this patent is extended or adjusted under 35 U.S.C. 154(b) by 0 days.

(21) Appl. No.: 14/252,109

(22) Filed: Apr. 14, 2014

Related U.S. Application Data (63) Continuation-in-part of application No. 13/169,576, filed on Jun. 27, 2011, now Pat. No. 8,695,762.

(60) Provisional application No. 61/344,323, filed on Jun. 29, 2010.

(51) Int. Cl.
| | |
|---|---|
| *E06C 7/48* | (2006.01) |
| *A01M 31/02* | (2006.01) |
| *E06C 7/42* | (2006.01) |
| *E06C 7/44* | (2006.01) |

(52) U.S. Cl.
CPC .................. *A01M 31/02* (2013.01); *E06C 7/48* (2013.01); *E06C 7/423* (2013.01); *E06C 7/44* (2013.01)

(58) Field of Classification Search
CPC ............. E06C 1/34; E06C 7/426; E06C 7/44; A01M 31/02
USPC ............. 182/20, 21, 115, 116, 187, 197, 214; 81/57.34, 57.46, 57.5, 58.1, 54
See application file for complete search history.

(56) References Cited

U.S. PATENT DOCUMENTS

| | | | |
|---|---|---|---|
| 91,600 A | 6/1869 | Ostrander | |
| 1,072,980 A * | 9/1913 | Owen | 81/58.1 |
| 1,915,715 A | 6/1933 | Bodendieck | |
| 2,069,953 A | 11/1936 | Strom | |
| 2,185,948 A * | 1/1940 | Pimm | 182/87 |
| 2,234,414 A | 2/1941 | Swann | |
| 2,658,416 A | 11/1953 | Duerksen | |
| 2,678,577 A | 5/1954 | Tackett | |
| 2,775,489 A | 12/1956 | Hagadorn | |
| 2,969,126 A * | 1/1961 | Gardner | 182/202 |
| 3,283,621 A | 11/1966 | Faso | |
| 3,336,999 A | 8/1967 | McSwain | |
| 3,572,188 A * | 3/1971 | Christian | 81/57.46 |
| 3,995,714 A | 12/1976 | Brookes | |
| 4,095,671 A * | 6/1978 | Forristall et al. | 182/202 |
| 4,257,490 A | 3/1981 | Bandy | |
| 4,688,657 A | 8/1987 | Erickson | |
| 4,706,780 A * | 11/1987 | Ohashi | 182/93 |
| 4,787,476 A | 11/1988 | Lee | |

(Continued)

OTHER PUBLICATIONS

"Shawnee's Claim to Fame: Robert Owen, Jr. Inventor of the Ratcher Wrench (Double-Acting Wrench) Discovered"; by W.J.Owen; http://littlecitiesofblackdiamonds.org/stories/shawneeowenratchey.html ; pp. 1-2; no date provided.*

*Primary Examiner* — Katherine Mitchell
*Assistant Examiner* — Colleen M Chavchavadze
(74) *Attorney, Agent, or Firm* — Mattingly & Malur, PC (57) ABSTRACT

An upright adaptor for a ladder tree stand converts that ladder tree stand into an upright tree stand. The adaptor includes a ladder stand base support which is attachable to the base of a tree and which receives the lower end of the ladder stand. A speed lock assembly is part of the upright adaptor and is attachable to an upper portion of the ladder tree stand. It includes a self-tapping screw and a double-acting ratchet wrench which is operable by a person standing on the ground once the ladder tree stand has been erected.

12 Claims, 6 Drawing Sheets

(56) References Cited

U.S. PATENT DOCUMENTS

| | | | |
|---|---|---|---|
| 5,040,635 A | 8/1991 | Strickland | |
| 5,211,087 A * | 5/1993 | Thomason | 81/63.2 |
| 5,279,390 A | 1/1994 | Phillips | |
| 5,350,038 A | 9/1994 | Lazarus | |
| 5,368,127 A | 11/1994 | Phillips | |
| 5,460,240 A | 10/1995 | Jones | |
| 5,562,180 A | 10/1996 | Herzog | |
| 5,579,867 A * | 12/1996 | Jarrel | 182/206 |
| 5,590,738 A | 1/1997 | Hunt et al. | |
| 5,655,623 A | 8/1997 | Skyba | |
| 5,791,436 A | 8/1998 | Talley | |
| 6,053,278 A | 4/2000 | Myers | |
| 6,138,792 A | 10/2000 | Morris | |
| 6,170,609 B1 | 1/2001 | Dech | |
| 6,199,660 B1 * | 3/2001 | Meeks | 182/116 |
| 6,334,508 B1 * | 1/2002 | Shields | 182/116 |
| 6,390,239 B1 | 5/2002 | McClain | |
| 6,523,643 B1 | 2/2003 | Rizza | |
| 6,719,093 B2 | 4/2004 | Garbs | |
| 6,811,180 B1 * | 11/2004 | Molliere | 280/652 |
| 7,237,649 B2 | 7/2007 | Harmston | |
| 7,296,500 B1 * | 11/2007 | Martinelli | 81/57.29 |
| 7,314,406 B2 | 1/2008 | Bilinovich | |
| 7,316,172 B1 * | 1/2008 | Chen et al. | 81/177.2 |
| 7,476,149 B2 * | 1/2009 | Burrows | 452/187 |
| 7,584,940 B2 * | 9/2009 | Gee | 254/238 |
| D605,914 S | 12/2009 | Brovold | |
| 8,011,476 B1 | 9/2011 | Alcon | |
| 8,424,639 B1 * | 4/2013 | Davis | 182/20 |
| 8,528,695 B1 * | 9/2013 | Orpia | 182/107 |
| 2003/0062220 A1 | 4/2003 | Lewis et al. | |
| 2004/0144595 A1 * | 7/2004 | Hanison | 182/180.2 |
| 2006/0207833 A1 | 9/2006 | Kessinger | |
| 2007/0169996 A1 | 7/2007 | Blue et al. | |
| 2008/0251316 A1 * | 10/2008 | Libert et al. | 182/115 |
| 2009/0229917 A1 | 9/2009 | Berkbuegler | |
| 2010/0089700 A1 | 4/2010 | Scudera et al. | |
| 2012/0037454 A1 * | 2/2012 | Fitzgezald | 182/201 |
| 2012/0080266 A1 * | 4/2012 | Brock | 182/107 |

* cited by examiner

UPRIGHT ADAPTOR FOR LADDER TREE STAND

CROSS-REFERENCE TO RELATED APPLICATIONS

This application is a continuation-in-part of prior U.S. patent application Ser. No. 13/169,576, filed Jun. 27, 2011, now U.S. Pat. No. 8,695,762, issued Apr. 15, 2014, the disclosures of which are expressly incorporated herein by reference.

FIELD OF THE INVENTION

The present invention is directed generally to an upright adaptor for a ladder tree stand. More particularly, the present invention is directed to an upright adaptor which, when utilized with a conventional ladder tree stand, converts the ladder tree stand into an upright tree stand. Most specifically, the present invention is directed to an upright adaptor for adapting a ladder tree stand to an upright tree stand by utilizing a ladder stand base support and a speed lock assembly. The ladder stand base support includes a tree anchor, an adjustable length stand-off and a ladder leg engagement assembly. The ladder stand base support is attachable to the lower ends of the ladder tree stand with the ladder leg engagement assembly including knuckle joints that will allow the ladder stand to be pivoted between a horizontal position and a vertical, tree engagement position. The speed lock assembly is attachable to the upper end of the ladder tree stand and utilizes a double acting, remotely operable rotatable ratchet wrench to drive a self-tapping screw into the tree. The wrench is operable from the ground by using two cords that are secured to the two arms of the wrench. The upright adaptor for a ladder tree stand configures a conventional ladder tree stand into an upright tree stand as disclosed in the parent application, with all of the safety benefits of such an upright tree stand.

BACKGROUND OF THE INVENTION

Tree stands are generally well known in the sport of hunting. Such tree stands typically include a hunter support platform placed in a tree at some distance above the ground, and a mechanism, such as a ladder, to allow the hunter to climb up to, and down from, the tree stand. With the advent of archery hunting seasons, such tree stands have become ever more popular.

A rudimentary tree stand might consist of a simple platform secured to a tree at a height of 10-20 feet above the ground. Such a platform may be constructed either on-site or off-site and transported to the desired location. Once at such a location, it will typically require the combined efforts of several people and one or more ladders to position the platform at the desired height and to secure it to the tree. Once the platform has been so secured, some type of a ladder, such as boards secured to the tree, or a conventional ladder will be required to afford access to, and egress from the simple platform.

Such rudimentary platforms are difficult to make, hard to install, unsafe to use, and are limited to use in only their originally installed position. A platform of lumber, plywood, and the like, is heavy and cumbersome. The need to have several people and several ladders, which must be hauled to a relatively remote hunting location, limits their use. The dangers inherent in attempting to secure the home-built platform to a tree, at a height of 10-20 feet above the ground are obvious. Once the platform has been installed, the task of moving it to a different location restricts its usefulness.

In an effort to overcome some or all of the limitations of these rudimentary tree stands, there has been proposed and implemented a number of portable tree stands which are not intended to be permanently secured to a specific tree. These tree stands are often characterized as ladder stands because they utilize some type of a ladder assembly to allow the user to access the platform which is situated at the top of the ladder. Such ladder stands are inherently unsafe and are still difficult to install. The base of the ladder or other stand can be secured to the base of a tree or supporting pole while the user is standing on the ground. The problem arises in the securement of the upper portion of the ladder or stand to the tree or pole at the top of the stand or ladder. It involves the user climbing up the stand, while the upper end of the stand is still not secured, and the lack of securement of the upper end of the stand while the user is situation at the top of the stand.

Ladder stands of this type need to be leaned against the tree. There is no provision for the securement of the upper end of the stand to the tree other than to climb the ladder and to secure the top of the ladder, while balancing at the top of the ladder. If the ladder slips, or if the user suffers a loss of balance, the result is a possibly very dangerous fall. In view of the fact that tree stands are typically installed in remote locations, the risk of such a fall, and of possible debilitating injury, is a very serious deterrent to the use of such ladder stands. More than 50% of accidents that occur in connection with deer hunting involve tree stands. Such accidents typically involve the hunter falling from the stand. Erecting of tree stands also is a cause of such accidents.

Ladder tree stands, although quite popular, are extremely dangerous, as described above. They require the user to ascend to the upper portion of the stand before that upper portion has been secured to the tree against which it has been placed. Such ladder tree stands also are not securely attached, at their lower end, to the supporting tree. The upright adaptor for a ladder tree stand, as will be discussed below, addresses the safety and stability issues that are common in currently available ladder tree stands.

SUMMARY OF THE INVENTION

It is an object of the present invention to provide an upright adaptor for a ladder tree stand.

Another object of the present invention is to provide an upright adaptor that includes a ladder stand base support and a speed lock assembly.

A further object of the present invention is to provide an upright adaptor for a ladder tree stand that is useful with different types of ladder tree stands.

Yet another object of the present invention is to provide the ladder tree stand base support of the upright adaptor with a ladder leg support assembly, including knuckle hinge joints.

Still a further object of the present invention is to provide the ladder leg engagement assembly of the upright adaptor with telescoping, adjustable length base support legs.

Even yet another object of the present invention is to provide the speed lock assembly of the upright adaptor as a self-tapping screw and a double-acting, remotely operable ratchet wrench assembly.

As will be described in detail in the subsequent Description of the Preferred Embodiment, the upright adaptor for a ladder tree stand in accordance with the present invention allows a conventional ladder tree stand to be adapted to function as an upright tree stand, as disclosed in parent application Ser. No. 13/169,576. The ladder tree stand base support of the upright adaptor includes a pair of spaced tree anchors which are attachable to the base of the tree and which are securely joined to the tree base. An adjustable length stand-off extends generally horizontally from the tree anchor to the ladder leg support assembly. The length of the stand-off can be varied to provide a desired angle of inclination of the ladder tree stand with respect to the tree against which it is to be leaned. The ladder leg engagement assembly, which is connected to the adjustable length stand-off at its end remote from the connection of the adjustable length stand off to the tree anchor, is itself adjustable in width to adapt to ladder stands having various spaces between the ladder rails or stiles. The ladder leg engagement assembly, itself has two base support legs, each of which is adjustable in length so that the ladder leg engagement assembly can conform to uneven ground on which the ladder stand is to be placed.

The rails or stiles of a typical ladder stand are either rectangular or circular in cross section, are hollow, and are open at their ends. The ladder leg engagement assembly of the upright adaptor uses spigots or ladder leg inserts at the upper ends of the legs to secure the ladder leg engagement assembly to the bottom of the ladder stiles or rails. Each of the ladder leg inserts is pivotably attached to the respective upper leg of the ladder leg engagement assembly by a knuckle hinge joint. Each ladder leg assembly is also adjustable in length. This allows the ladder leg engagement assembly to be positioned on a scoped or uneven support surface, such as the natural floor of a forest in which the tree that will receive the tree stand is located. By proper adjustment of the lengths of the two support legs, the width of the ladder leg engagement assembly and the length of the stand off, the upright adaptor for a ladder tree stand, in accordance with the present invention, can be adapted for use with virtually any commercially available ladder tree stand.

The speed lock assembly, in accordance with the present invention, is the same in general structure and operation as the one disclosed in the parent application Ser. No. 13/169,576. It uses a self-tapping screw that is rotatable by the operation of a double acting, remotely operable ratchet wrench. In the subject invention, the speed lock assembly is provided with a pair of diverging arms, each of which is engagable with the surface of the tree. The speed lock assembly is securable to an upper end of the conventional ladder tree stand in a manner that is a function of the particular structure of the individual ladder tree stand.

In use, the ladder tree stand assembly is positioned at the base of a suitable tree. The ladder leg engagement assembly uses its knuckle hinge joints to orient the ladder bottom receiving connections generally horizontal. The base of the two upright rails or stiles of the ladder are placed over the ladder bottom receiving inserts and the speed lock assembly is attached to the top of the ladder stand. Utilizing hand-over-hand motion, the ladder stand is moved from a horizontal position to a generally vertical position, in which the self-tapping thread of the speed lock assembly can be screwed into a tree, by a person standing on the ground, through the use of the ratchet wrench and its two elongated cords. Once the upper end of the tree stand has been attached to the tree, the user can then ascend to the tree stand support platform and can further secure the stand top to the tree using a suitable ratchet strap or the like.

The upright adaptor for a ladder tree stand, in accordance with the present invention, significantly improves the safety of virtually any ladder tree stand. It allows for the erection and securement of the ladder tree stand in place by a user who remains on the ground during the entire process. The upright adaptor for a ladder tree stand in accordance with the present invention overcomes the limitation of the prior art tree stands and is a substantial advance in the art.

BRIEF DESCRIPTION OF THE DRAWINGS

While the novel features of the upright adaptor for a ladder tree stand, in accordance with the present invention, are set forth with specificity in the appended claims, a full and complete understanding of the invention may be had by referring to the Detailed Description of the Preferred Embodiment, which is presented subsequently, and as illustrated in the accompanying drawings, in which:

DESCRIPTION OF THE PREFERRED EMBODIMENT

Figure 1:
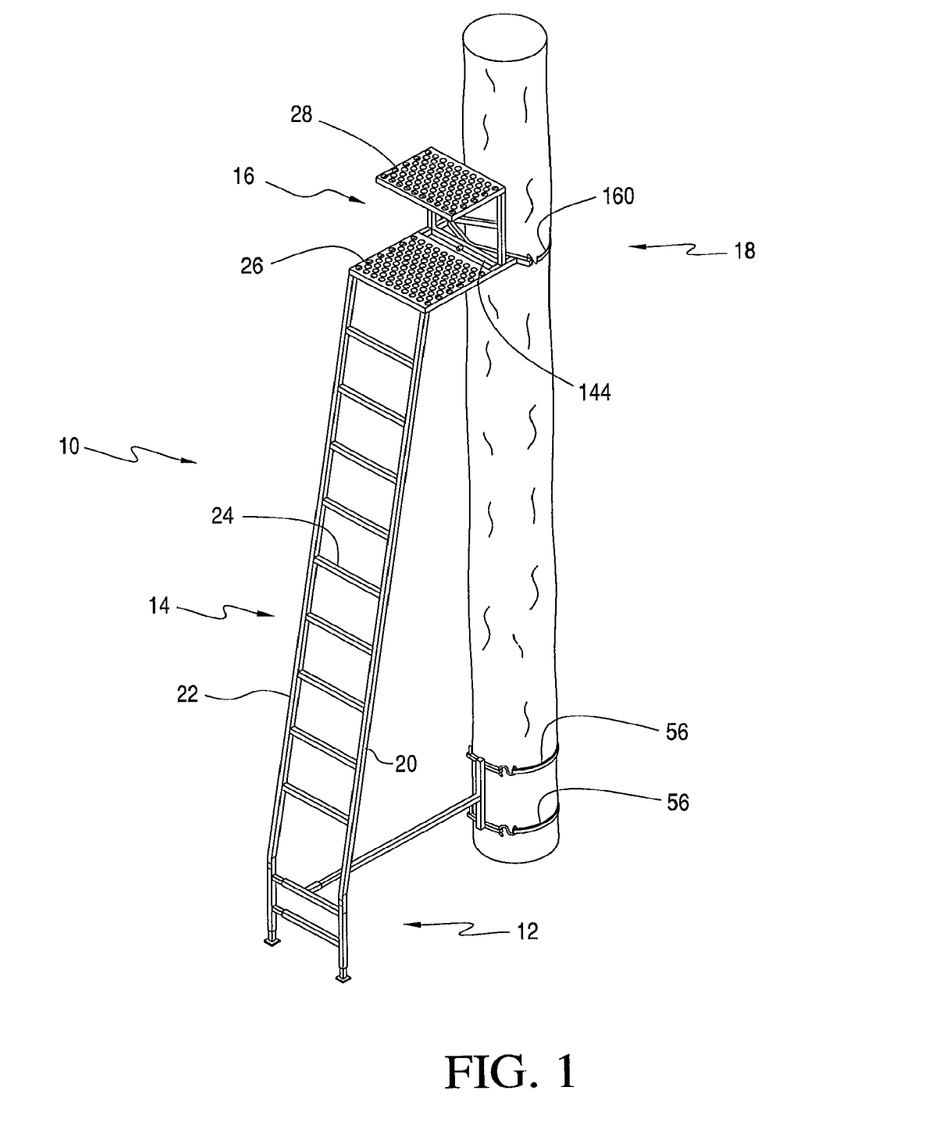
FIG. 1 is a perspective view of an upright adaptor for a ladder tree stand in accordance with the present invention in use with a conventional ladder tree stand.
Figure 3:
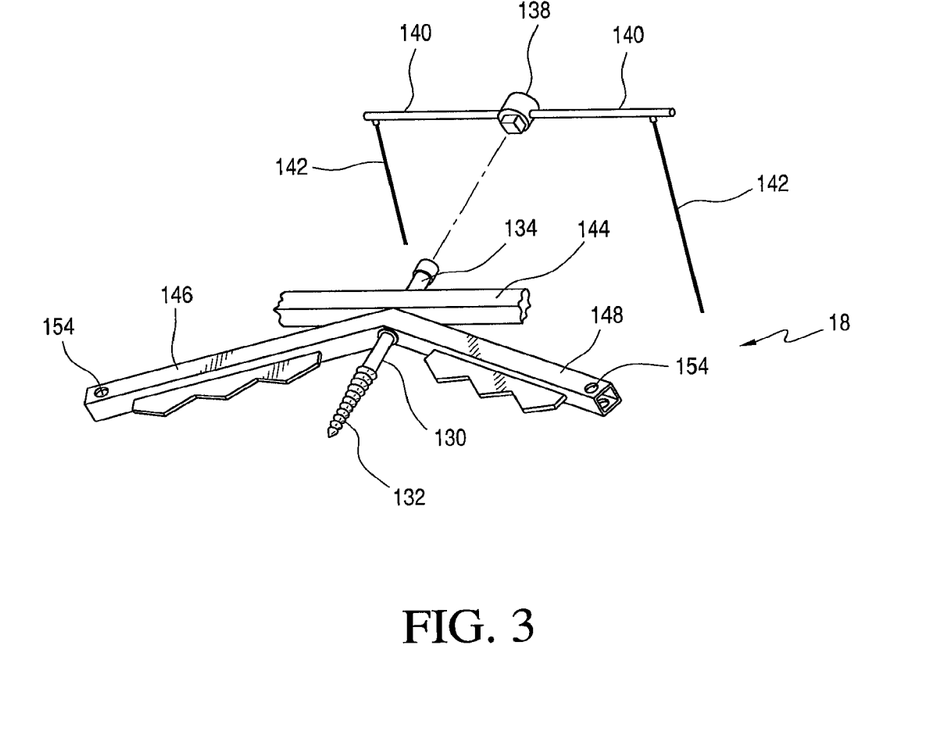
FIG. 3 is a perspective view of the speed lock assembly of the present invention and which is securable to an upper portion of a conventional ladder tree stand.
Figure 4:
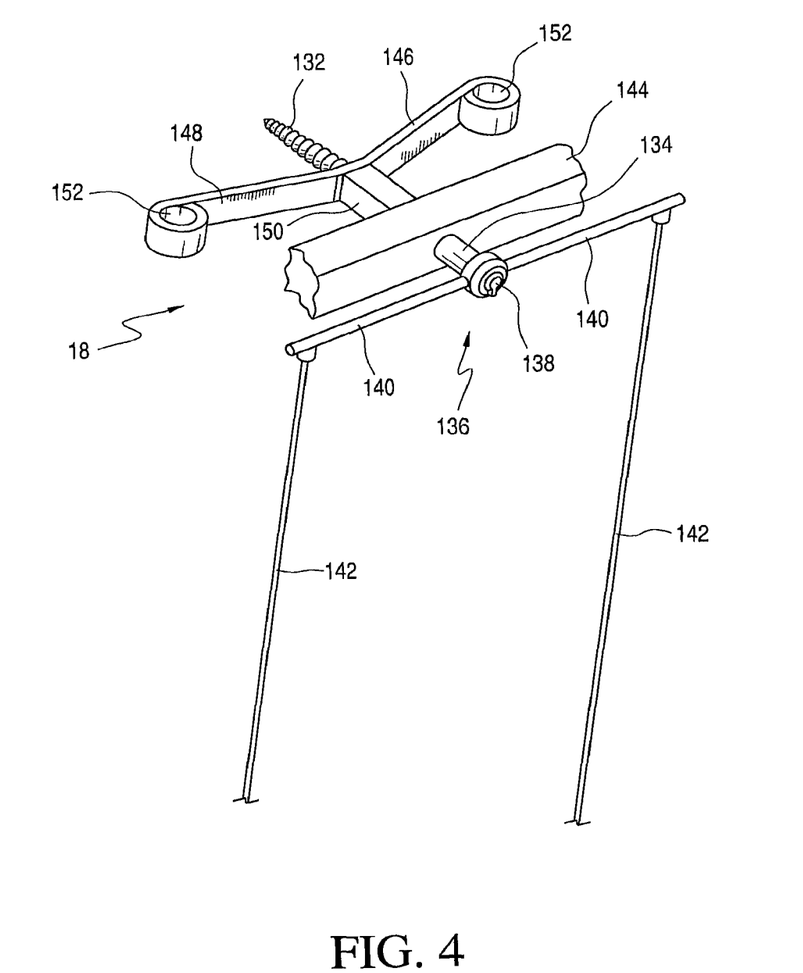
FIG. 4 is another perspective view of the speed lock assembly and showing its attachment to an upper portion of the ladder tree stand.

Referring initially to FIG. 1, there may be seen, generally at 10, a preferred embodiment of an upright adaptor for a ladder tree stand in accordance with the present invention. The upright adaptor, generally at 10, includes a ladder stand base support, generally at 12, which cooperates with a generally conventional ladder tree stand that includes a ladder, generally at 14, and a platform assembly, generally at 16 which is secured to the top of the ladder tree stand. A speed lock securement assembly, generally at 18, and as may be seen in more detail in FIGS. 3 and 4, is secured to a portion of the platform assembly 16, as will be discussed in detail subsequently.

It will initially be understood that the ladder tree stand depicted in FIG. 1 is meant to be exemplary of any number of conventional such ladder tree stands with which the present invention can be used. The ladder 14 is configured of a pair of spaced rails or stiles 20, 22 which are typically parallel to each other and which are secured to each other by a plurality of rungs 24. Each ladder rail or stile 20, 22 is typically made of light-weight material, such as steel or aluminum tubing, is usually either square or circular in cross-section, and is hollow. Since the ladder tree stand is intended to be carried into the woods and is meant to be moved from time to time, it is structured to be light and durable.

The platform assembly, which is depicted schematically at 16, is secured at the top of the ladder 14 and is intended to provide a horizontal support platform 26 and a seat 28. It will again be understood that the platform assembly 16 is merely illustrative of any number of suitable platforms which are positioned at the top of a conventional ladder tree stand. Such platforms can include arm rests, overhead rain and snow shields, fall arrestors and the like. The upright adaptor, in accordance with the present invention, is usable with a wide variety of such ladder tree stands.

Figure 2:
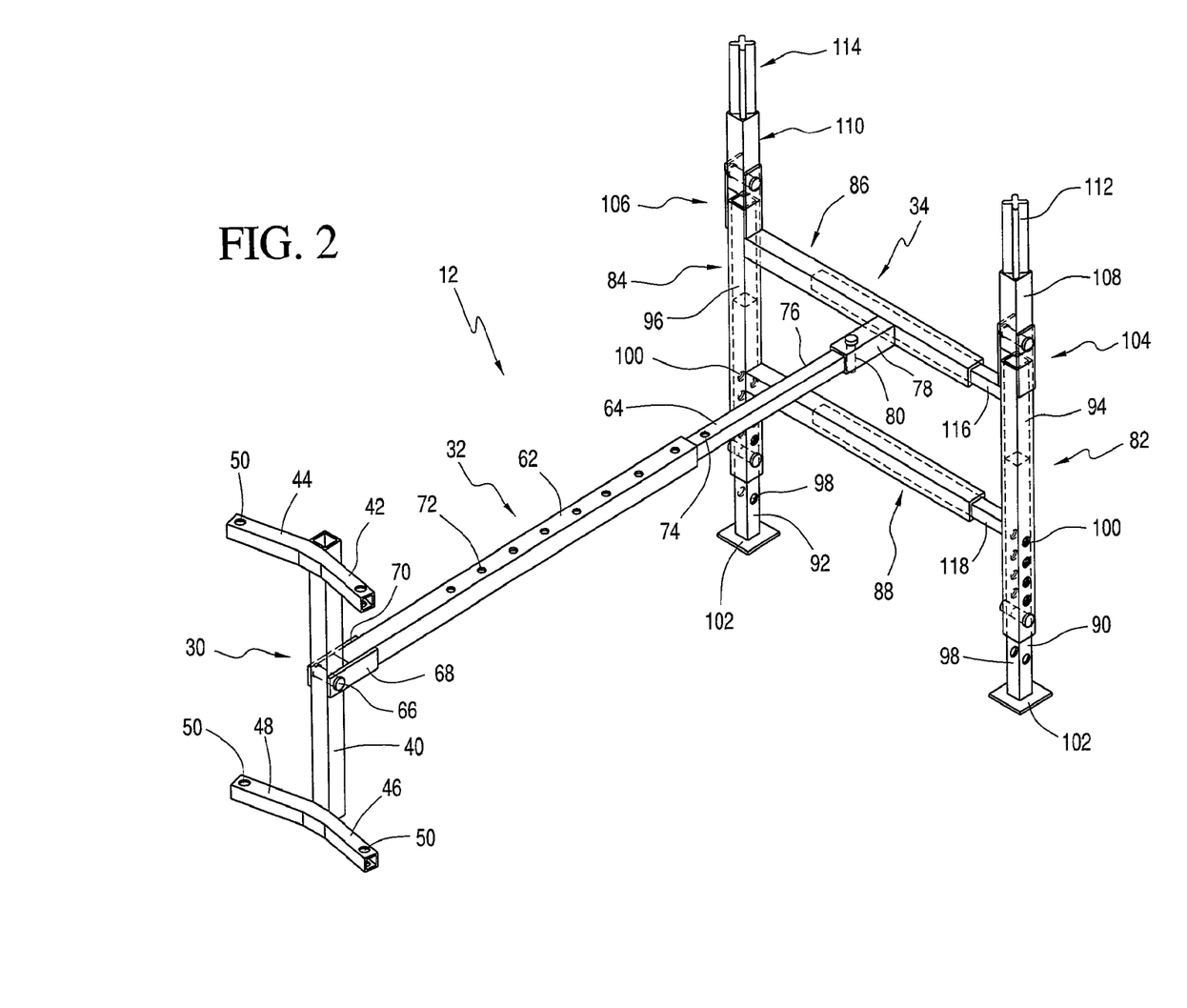
FIG. 2 is a perspective view of a ladder tree stand base support assembly of the subject invention.

Referring again to FIG. 1, and taken in conjunction with FIG. 2, the ladder stand base support, generally at 12, will now be described in detail. The ladder stand base support 12 is configured generally of three components; a tree anchor section 30, an adjustable length stand-off 32 and a ladder leg engagement assembly 34. In combination, these three components of the ladder stand base support 12 cooperate to secure the support to a tree or pole 36, to compensate for uneven surfaces surrounding that tree or pole 36 and to space the ladder leg engagement assembly 34 spaced at a sufficient distance from the base of the tree or pole 36 to allow a suitable inclination of the ladder 14, when the ladder is actually leaned against the tree or pole 36.

Referring again to FIG. 2, the tree anchor section 30 is preferably configured using an upright anchor arm support 40 which is provided with an upper pair of tree engaging anchor arms 42, 44 and with a lower pair of tree engaging anchor arms 46, 48. All of these elements are preferably formed of high strength metal tubing of the type described in the parent application Ser. No. 13/169,526, and can be powder-coated or otherwise protected from rust and corrosion. Each pair of anchor arms 42, 44; 46, 48 are angled slightly with respect to their connections to the upright anchor arm support 40 so that they will have a slight V or saddle shape. This facilitates their engagement with the base of the tree 36. Each anchor arm 42, 44; 46, 48 is provided with an aperture 50 at its outer end. Each such aperture 50 is provided to facilitate the attachment of a suitable ratchet strap 52, as is depicted schematically in FIG. 1 to the ends of each pair 42, 44; 46, 48 of arms, each of which ratchet straps 58 can be placed about the circumference of the base of the tree 36 and can be used to securely attach the tree anchor section 30 to the base of the tree. While ratchet straps 56 are the most desirable means to secure the tree anchor 30 to the base of the tree 36, other securement assemblies, such as ropes or the like can be used. Ratchet straps 56 are preferred because they typically come with end hooks that can be placed in the anchor arm apertures 50 and because their ratchet mechanisms facilitate secure, yet detachable connection of the tree anchor section to the base of the tree 36.

Referring again to FIG. 2, the tree anchor section, generally at 30, is connected to an outboard end 60 of the adjustable length stand-off, generally at 32. Adjustable length stand-off, as depicted in FIG. 2, includes an outer tube 62 and an inner tube 64. Both of these tubes 62, 64 are preferably square in cross-section and are made of a material that is the same as that used for the tree anchor section 30. Since the ladder stand base support 12 is intended to be carried to its point of use, and may be left in the elements for extended periods of time, it must be both light and rust proof. Powder coated, high strength steel tubing is a preferred material for use to fabricate the ladder stand base support 12.

The outer tube 62 is attached, at its outboard end 60, to the upright anchor arm support 40 using a generally horizontal swivel pin 66. This swivel pin 66 passes through spaced ends 68, 70 of the outer tube 62 and through the mid point of the anchor arm 40. This will allow the tree anchor support 30 to move to some degree, with respect to the outer end 60 of the outer tube 62, to facilitate the attachment of the three anchor section 30 to a tree 36 that might not be vertical.

The outer tube 62 and the inner tube 64 are in telescoping engagement with each other to allow the overall length of the stand-off to be adjusted. A plurality of alignable locking pin receiving holes 72, 74 are formed in the outer and inner tubes 62, 64, respectively. One or more generally conventional releasable locking pins, which are not specifically shown, can be inserted through aligned ones of the holes 72 and 74 to fix the overall length of the adjustable length stand-off 32. That overall length will be a function of the length of the ladder tree stand and of the desired inclination of that ladder.

An inboard end 76 of the inner tube 64 of the adjustable length stand-off 32 is securable in a tube socket 76 which is part of the ladder leg engagement assembly, generally at 34, as will be discussed in greater detail below. The tube socket 78 is dimensioned to receive the inboard end 76 of the inner tube 64. The two are detachably coupled by a removable, generally vertically oriented inboard swivel pin 80 that is generally the same as the outboard swivel pin 66. The inboard swivel pin 80 is oriented vertically to allow the ladder end engagement assembly 34 to pivot about a generally vertical axis defined by the inboard swivel pin 80. The cooperation of the outboard swivel pin 66 and the inboard swivel pin 80, together with the adjustable legs of the ladder leg engagement assembly, as will be discussed below, provides the ladder stand base support 12 with sufficient adjustability to adapt to a wide range of sloping terrain.

The ladder leg engagement assembly, generally at 34, includes a pair of adjustably spaced, vertical leg assemblies generally 82 and 84. These are connected to each other by upper and lower cross-tubes 86, 88. Each of the vertical leg assemblies 82 and 84 has a lower, inner leg section 90, 92 and an upper, outer leg section 94, 96. As was the case with the outer and inner tubes 62, 64 of the adjustable length stand-off, the vertical leg assemblies 82, 84 are both independently height adjustable by the provision of the plurality of spaced height adjustment holes 98, 100. Suitable lock pins, which are generally known and which are not specifically depicted in FIG. 2, can be used to hold each vertical leg assembly at a desired height.

Each lower leg section is provided, at its lower terminus, with a support pad 102. These support pads 102 are depicted as being square. However, their size and shape can be varied as a function of the terrain on which they will be used. It is also within the scope of the present invention to provide several different sizes of support pads so that the ladder end engagement assembly 34 can be supported on different surfaces with varying configurations.

The upper end of each of the upper tube sections 94, 96 is provided with a knuckle hinge joint assembly, generally at 104, 106. Each such knuckle hinge joint assembly is discussed in greater detail in the parent application Ser. No. 13/169,526. Each such knuckle hinge joint assembly 104, 106 joins a ladder bottom connector 108, 110 to the upper end of upper outer leg section 94, 96. Each ladder bottom connector 108, 110 terminates in an upwardly directed ladder bottom insert 112, 114. These inserts are depicted as being cross-shaped in plan view. Their shape is exemplary of various shapes that could be utilized. The shape and size of each such ladder bottom adaptor 112, 114 is structured so that it will snugly fit into the interior of a hollow ladder style or rail 20, 22 with which the ladder leg engagement assembly 34 will be used. It is within the scope of the present invention to provide ladder bottom connections 108, 110 with inserts 112, 114 of various sizes to further ensure that any ladder tree stand can be connected to the ladder stand to base support 12.

The upper and lower cross tubes 86 and 88 are each configured of an inner cross tube 116, 118 and an outer cross tube 120, 122. The inner and outer cross tubes of each of the upper and lower cross tubes are telescopingly engaged. This allows the width of the ladder leg engagement assembly 34 to be varied in accordance with the width of the specific ladder stand with which it will be used. While no adjustment holes and pins are shown for the upper and lower cross tubes, because the spacing of the legs 82 and 84 will be determined by the width of the ladder stand, it is understood that such holes and pins, similar to those used on the adjustable length stand-off and in the adjustable length leg assemblies could be provided.

As may be seen generally in FIG. 1, and as is more clearly depicted in FIGS. 3 and 4, the speed lock assembly, generally at 18, is typically attached to an upper portion or frame of the horizontal support platform 26 that is secured to the top of the ladder 14. Since there are a wide variety of ladder tree stand horizontal support platform configurations, the following discussion will be somewhat exemplary. The important aspect of the attachment of the speed lock assembly 18 to the top of the ladder stand is that it will be able to engage the tree against which it is placed, and that the double acting ratchet wrench will be operable by an operator standing on the ground.

As may be seen in FIGS. 3 and 4, the speed lock assembly, generally at 18, includes a rotatable screw 130 which is provided, at one end, with self-tapping threads 132. At the end of the screw 130 opposite to its threads, there is provided a head, which is not specifically shown, and which is sized to receive a conventional drive socket 134 of a double-acting ratchet wrench 136. As is disclosed in detail in the parent application, this double-acting ratchet wrench 136 has a reversible ratchet drive head 138. That drive head 138 is provided with two diametrically opposing drive handles 140. Each such drive handle 140 is provided, at its outer end, with a length of cord 142. The length of each such cord 142 is sufficient to reach to the ground when the ladder tree stand is in its use position. In this way, a person standing on the ground can engage the two cords and can operate them to rotate the self-tapping screw 130 either into engagement with the tree or to disconnect the screw 130 from engagement with the tree.

As is depicted schematically in both of FIGS. 3 and 4, the speed lock assembly, generally at 18, is rotatably attached to a frame member, generally at 144, of the horizontal support platform 26 of the ladder tree stand. As noted above, since there are a wide variety of ladder tree stands, each with various horizontal support platform frames, the frame section depicted at 144 is intended to be a generic depiction. It will be understood that the speed lock assembly 118 is adaptable to being connected through virtually any support platform frame, so long as the screw 130 is rotatable, the socket 134 and the drive head 138 of the double acting ratchet wrench can engage the lead of the screw and the wrench can be operated by alternating downward motions imparted to the two space cords 142 by an operator who remains standing on the ground.

The speed lock assembly, generally at 18, has a pair of lock assembly arms 146, 148. These extend out from a central mounting point 150 and are slightly angled to perform a wide V-shaped tree engaging saddle. Each of the arms 146, 148 can have either an eye 152, as seen in FIG. 4, or a bore 154, as seen in FIG. 3, at its outboard end. These eyes 152 or bores 154 are used for the same purpose as are the arm apertures 50. They act as attachment points for a tree-encircling ratchet strap, such as the one depicted schematically at 160 in FIG. 1. It will be understood that ratchet strap 160 is installed only after the speed lock assembly 18 has been used to secure the horizontal support platform 26 or another upper platform of the ladder tree stand to the tree 36.

The speed lock assembly arms 146 and 148 are depicted in FIG. 3 with tree engaging teeth or serrations 162. These will bite into the surface of the tree and may aid in the positive connection of the ladder tree stand to the tree 36. In FIG. 4, the arms 146 and 148 are depicted with smooth tree engaging surfaces. These will do less damage to the tree but are slightly more prone to slippage until the ratchet strap is securely attached. The inner surfaces of the arms of the tree anchor section 30 could also be provided with similar serrations or teeth, if desired.

Figures 5, 6:
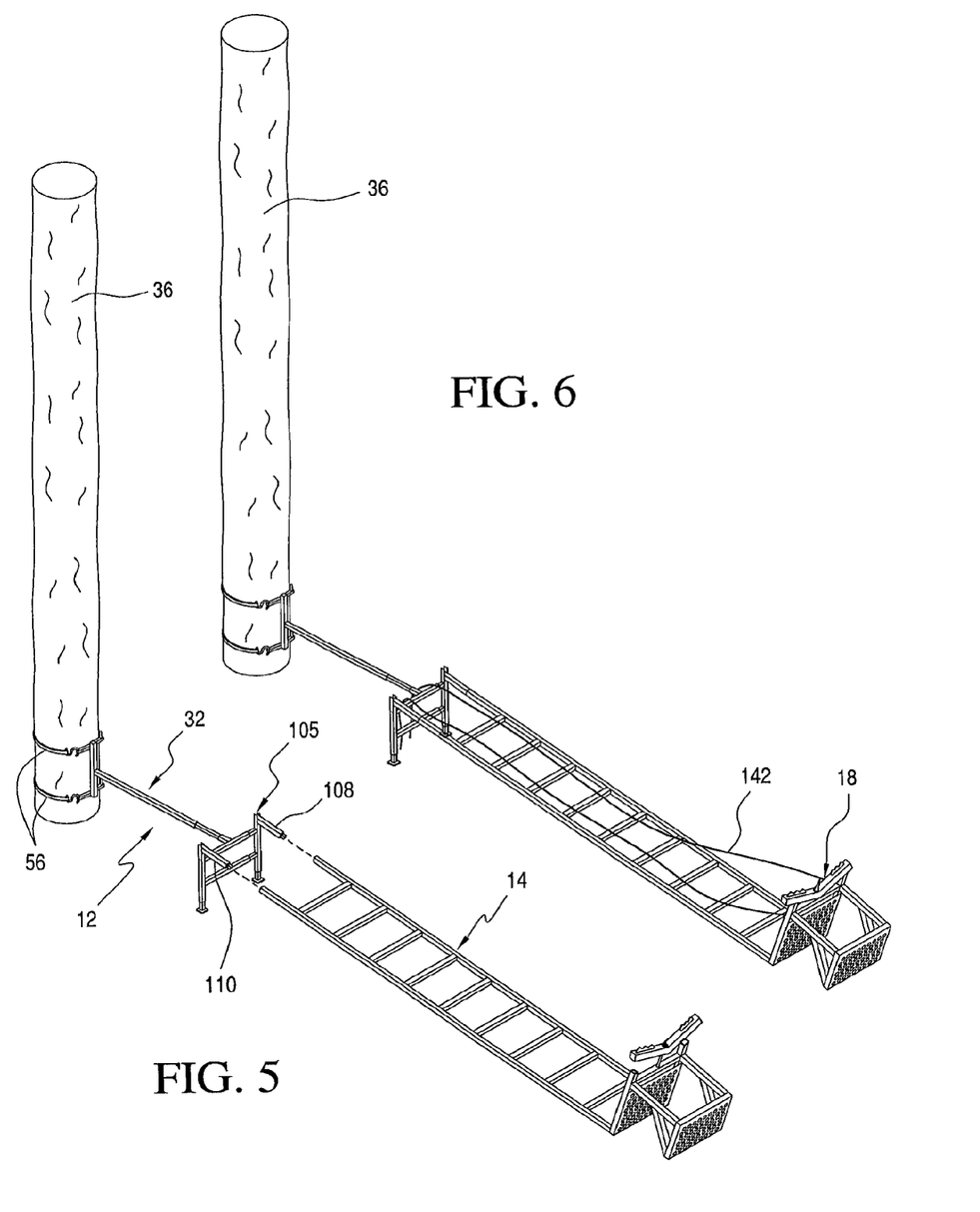
FIGS. 5-8 are schematic depictions of the sequence of steps utilized in the erection of a ladder tree stand using the upright adaptor in accordance with the present invention.

Turning now to FIGS. 5-8, there is depicted, somewhat schematically, the use of the upright adaptor for a ladder tree stand. For ease of understanding, the majority of the reference numerals and lead lines used FIGS. 1-4 have not been repeated in FIGS. 5-8. Initially, as seen in FIG. 5, the ladder stand base support 12 is attached to the tree by engagement of the arms 42, 44; 46, 48 with the tree and by attachment of the ratchet straps 56. The length of the adjustable length stand-off 32 is selected, based on the length of the ladder 14. The knuckle hinge joint assemblies 104 are used to orient the ladder bottom connectors 108 and 110 in a generally horizontal direction. The lower, open ends of the ladder stiles or rails 20, 22 are aligned with the ladder bottom inserts 112, 114 of the ladder leg engagement assembly and the ladder leg bottoms are slid over those inserts 112, 114. It will be understood that the length of the two vertical leg assemblies 82, 84 will have been adjusted so that the ladder 14 will extend generally vertically when it is raised to its used position.

As depicted in FIG. 6, once the ladder tree stand leg bottoms have been connected to the ladder stand base support, the speed lock assembly, generally at 18 is attached. The drive head 138 of the double-acting ratchet wrench is set to rotate the self-tapping screw in an insertion direction. The two cords 142 are connected and are checked to be sure that they extend to the ladder stand base support.

Figures 7, 8:
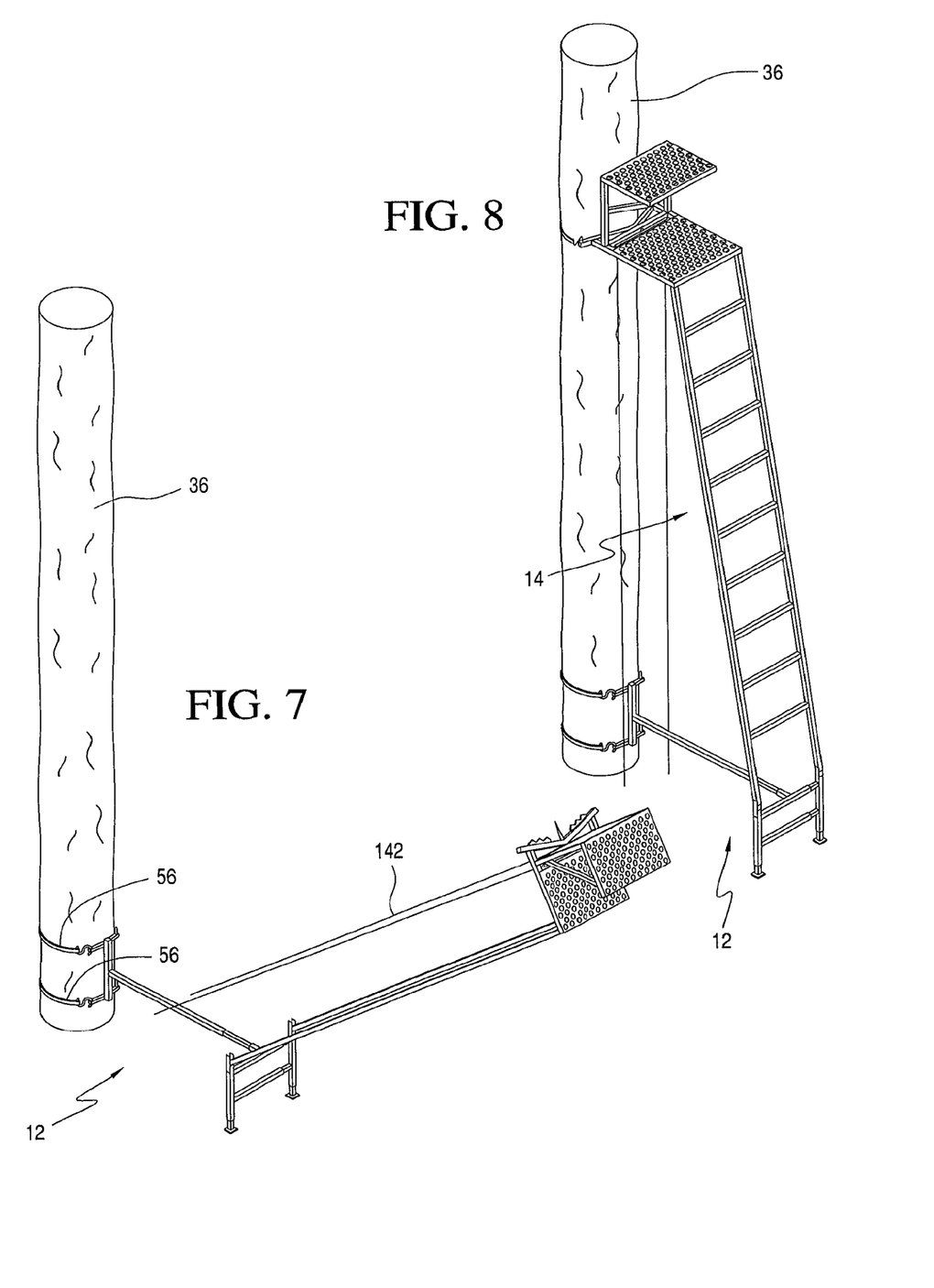

As is depicted in FIG. 7, the ladder stand is then raised using a hand-over-had motion by the operator who slowly walks toward the tree while raising the ladder stand. This is made possible by the action of the knuckle hinge joint assemblies 104 and 106. As the ladder stand passes past a vertical orientation, as is seen in FIG. 7, the point of the self-tapping screw thread 130 of the speed lock assembly 18 will forcefully be brought into engagement with the tree. This force should be sufficient to embed at least the point of the screw threads into the tree. The operator, while still standing on the ground, can easily use the double-acting ratchet wrench assembly to rotate the self-tapping screw, to engage the screw into the tree to thereby secure the upper end of the ladder tree stand in place. Once this has been done, the operator can then ascend the ladder to the horizontal support platform and can then use a ratchet strap such as the one depicted at 160 in FIG. 1, to further positively secure the upper portion of the ladder tree stand to the tree. The above-described steps can be reversed to take the ladder tree stand down and to disconnect it from the ladder stand base support, which can then be disassembled from the tree and moved to another location, if desired.

All of the components of the ladder stand base support can be taken apart from each other for ease of transportation and storage. The tree anchor section 30 can be disconnected from the adjustable length stand-off 32 by removal of the swivel pin 66. The adjustable length stand-off 32 can be separated from the ladder leg engagement assembly 34 by removal of the swivel pin 80. The two tube sections 62 and 64 of the adjustable length stand-off 32 can be separated. The ladder leg engagement assembly can also be broken down into two components by separation of the two cross tubes 86 and 88. If desired, the vertical leg assemblies 82 and 84 can also be separated. All of these various components can be packed in a relatively small space for transport together with the double-acting ratchet wrench of the speed lock assembly 18. Since these various components are made of high-strength, light-weight materials, such as thin-walled steel tubing, as is described in the parent application, they are sufficiently light in weight that their transport to an intended point of use is not particularly difficult.

While a preferred embodiment of an upright adaptor for a ladder tree stand, in accordance with the present invention, has been set forth fully and completely herein above, it will be apparent to one of skill in the art that a number of changes in, for example, the specific material used in the construction of the ladder stand base assembly, the structure of the locking pins, the specific structure of the double-acting ratchet wrench and the like could be made without departing from the true spirit and scope of the subject invention which is accordingly to be limited only by the following claims.

What is claimed is:

1. An upright adaptor assembly for a ladder tree stand, the upright adaptor assembly comprising:
   a ladder tree stand base support including a tree anchor section, a ladder tree stand leg engagement assembly and an adjustable length stand-off connecting the tree anchor section and the ladder tree stand leg engagement assembly, said ladder tree stand base support being usable to support a base of the ladder tree stand; and
   a speed lock assembly attachable to an upper end of the ladder tree stand and including a self-tapping screw thread and a ratchet wrench, said ratchet wrench including diametrically opposed extending arms, each arm having a free end and each arm having a cord attached to its free end and wherein each cord is of sufficient length to reach a support surface on which the ladder tree stand base support is placed when the upright adaptor assembly is attached to the ladder tree stand and the ladder tree stand is supported by the upright adaptor assembly in an erected, in-use position.

2. The upright adaptor assembly of claim 1 wherein the tree anchor section includes an upright anchor arm support and at least a first pair of tree engaging anchor arms.

3. The upright adaptor assembly of claim 2 further including a second pair of tree engaging anchor arms attachable to said upright anchor arm support and spaced from said first pair of tree engaging anchor arms.

4. The upright adaptor assembly of claim 1 wherein said ladder leg tree stand engagement assembly includes spaced vertical leg assemblies and at least one cross tube.

5. The upright adaptor assembly of claim 4 wherein each of said vertical leg assemblies is adjustable in length.

6. The upright adaptor assembly of claim 4 wherein each of said vertical leg assemblies has a ladder tree stand leg bottom connector at its upper end.

7. The upright adaptor assembly of claim 6 wherein each of said ladder tree stand leg bottom connectors is joined to the upper end of its respective one of the vertical leg assemblies by a knuckle hinge joint assembly.

8. The upright adaptor assembly of claim 6 wherein each of said ladder tree stand leg bottom connectors is provided with a ladder bottom insert.

9. The upright adaptor assembly of claim 1 wherein said adjustable length stand-off is separably connected to said tree anchor section and also to said ladder tree stand leg engagement assembly by removable swivel pins.

10. The upright adaptor assembly of claim 1 wherein said ladder tree stand leg engagement assembly is adjustable in width.

11. The upright adaptor assembly of claim 1 wherein said speed lock assembly includes a pair of speed lock assembly tree engaging arms.

12. The upright adaptor assembly of claim 11 wherein each said speed lock assembly tree engaging arm has serrated teeth on its tree engaging surface.

\* \* \* \* \*